United States Patent [19]  [11] 3,893,980
Allcock et al.  [45] July 8, 1975

[54] POLY(AMINO ACID ALKYL ESTER PHOSPHAZENES)

[75] Inventors: Harry R. Allcock; Karen M. Smeltz; Daniel P. Mack, all of State College, Pa.

[73] Assignee: Pennsylvania Research Corporation, University Park, Pa.

[22] Filed: Mar. 29, 1974

[21] Appl. No.: 456,351

[52] U.S. Cl..... 260/78 A; 260/29.2 N; 260/DIG. 43
[51] Int. Cl............................................. C08g 20/08
[58] Field of Search................... 260/78 A, DIG. 43

[56] References Cited
OTHER PUBLICATIONS

Allcock, H. R. et al., Chemical Society Journal, Pt.D, (1970), Vol. 11, pp. 685, QD1C6ad.

Allcock, H. R., C & EN, (Apr. 1968), pp. 68–81, TP1I418.

Kosolapoff, G. M., Organophosphorus Compounds, (John Wiley, N.Y.) (1950) pp. 6, QD412P1K5.

*Primary Examiner*—Lucille M. Phynes
*Attorney, Agent, or Firm*—Cooper, Dunham, Clark, Griffin & Moran

[57] ABSTRACT

Biodegradable and biocompatible high polymers based on substitution of chlorine atoms of poly(dichlorophosphazenes) with lower alkyl amino acid esters. The polymers may additionally contain methylamino or ethylenimino substituents.

46 Claims, No Drawings

POLY(AMINO ACID ALKYL ESTER PHOSPHAZENES)

BACKGROUND OF THE INVENTION

This invention is concerned with novel high polymers which are especially useful as biocompatible elastomers for the replacement of body parts such as heart valves and blood vessels and as biodegradable elastomers for use as synthetic sutures. The polymers of the invention are not limited to this utility since their elastomeric and film forming properties make them useful for a wide variety of other purposes for which high polymers are already employed, as will be readily apparent to those skilled in the art from a study of this disclosure.

THE INVENTION

Generally speaking, the polymers of this invention are poly(amino acid alkyl ester phosphazenes) which may additionally contain methylamino or ethylenimino substituents in the molecule. They are prepared by reaction between known poly(dichlorophosphazenes) and a lower alkyl ester of an amino acid hydrohalide, preferably a hydrochloride. Methylamino and ethylenimino groups are substituted on the polymer chain in a similar manner.

The reaction to form the polymers of the invention may be generally represented by the following equation which shows the formation of a glycine methyl ester substituted polymer:

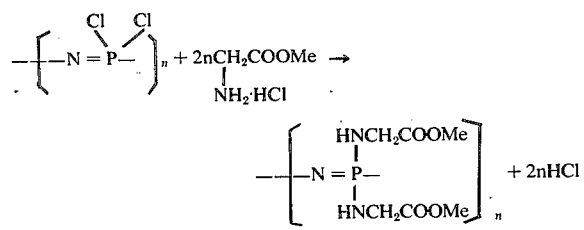

The reaction will take place in the presence of a hydrogen chloride scavenger, suitably a tertiary amine such as pyridine or triethylamine.

In principle, any amino acid ester is a potential substituent. In practice, however, a number of chemical and commercial considerations combine to make monoamino, monocarboxylic, aliphatic amino acid esters, such as glycine, valine, alanine, leucine and isoleucine the preferred reactants. These acids are generally the most readily available commercially. Additionally, their amino functions are not sterically hindered, and are available for reaction under relatively moderate conditions of time and temperature.

Another important consideration is that the amino group is the only functional group available for attack at the phosphorous atom to eliminate the hydrogen halide. It has been observed that the halogen atoms on poly(dichlorophosphazene) are quite easily eliminated as hydrogen halide. Thus, while tyrosine or lysine are in fact potential reactants, they are not the most preferred reactants since the hydroxyl group of tyrosine and the delta-amino group of lysine must be blocked to insure that only the alpha-amino group of the selected amino acid reacts.

The amino acid reactant should, therefore, be free of active hydrogens except for the replaceable hydrogen on the amino group. It is for this reason that the carboxylic acid group is blocked as a lower alkyl ester. If dicarboxylic acids are employed, both acid moieties should be protected. With dibasic acids, it is of course possible to block the alpha-amino group, and effect reaction at the other basic group.

It will be noted from the above reaction that the molecular weight of the final polymer will depend upon the molecular weight of the original poly(dichlorophosphazene) reactant. The most useful compounds within the scope of this invention are those in which $n$ is from about 500 to 20,000. Although polymers in which $n$ is appreciably less than 500 can be usefully employed for many purposes, it is usual that $n$ is not markedly higher than 20,000 since the starting polymers tend to depolymerize under the conditions necessary for the preparation of the desired products.

The molecular weight range for the compounds of this invention will vary somewhat with the amino acid constituent, but is generally from about 100,000 to 4,000,000.

The presence of the methylamino group in the products of this invention generally tends to increase their hydrophilicity. If a sufficient number of such groups are present, the polymer may in fact be water soluble. Thus, it is possible by selection of the number of methylamino groups in the molecule to produce products with substantially any desired degree of hydrophilicity. Useful products have been prepared in which the number of methylamino groups per repeating unit is from about 0.25 to 1.75.

The ability to impart predetermined hydrophilicity in the products of this invention is a very important feature. Generally speaking, biocompatible plastics should be either substantially completely hydrophobic so as to reject all body fluids, or hydrophilic so that they are wet by body fluids and do not act as internal irritants. Products intended for use as sutures should be sufficiently hydrophilic so that the enzymes of the body can slowly penetrate them and catalyze slow hydrolysis. An incidental advantage of the products of the invention is that, when they are biodegraded in the body, the breakdown products are non-toxic.

The products of this invention can be fabricated utilizing standard polymer processing techniques. Thus, for example, they can be cast as films from solution, they can be extruded or they can be molded. To utilize these techniques, it is best to avoid cross-linking during the formation of the polymer, since cross-linked polymers are generally too rigid to be readily processed. However, it is sometimes desirable to cross-link the product after it has been formed, for example by heating, as in the case with curing rubber and other polymers. Cross-linking increases the dimensional stability of the polymer. This can be especially important if the polymer is employed as an internal body replacement part. Such parts should, of course, neither swell or shrink.

One very useful technique for cross-linking is to prepare the polymers to contain a small number of ethylenimino groups. Such molecules are readily cross-linked by heating at any time after formation. The cross-linking appears to take place by a free radical mechanism in which adjacent polymer chains are linked through tetramethylene groups. In polymers which are prepared for corss-linking, the number of ethylenimino groups per repeating unit is generally from about 0.0001 to 0.2.

The amino acid substituted polymers of this invention can be represented by the formula:

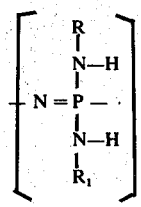

wherein:
1. R is $R_2CHCOOR_3$; $R_2$ being the residual group of an amino acid, such as the hydrogen of glycine, the methyl of valine, the benzyl of phenylalanine or the methyl thioethyl of methionine; and $R_3$ is an alkyl group containing up to five carbon atoms. The preferred alkyl groups are straight chain, and for commercial reasons methyl and ethyl groups are most preferred.
2. $R_1$ is R, as defined above, methylamino or ethylenimino. $R_1$ and R are not not necessarily derived from the same amino acid, although for practical reasons it is best that they are.

As stated above, the value of $n$ is normally from about 500 to 20,000, the average number of methylamino and ethylenimino groups per repeating unit is, respectively, from about 0.25 to 1.75 and from 0.0001 to 0.2.

The following table shows the identity of $R_2$ and the amino acid from which it is derived in the preferred compounds of this invention.

TABLE I

| $R_2$ | Amino Acid |
|---|---|
| Hydrogen | Glycine |
| Methyl | Alanine |
| Isopropyl | Valine |
| Isobutyl | Leucine |
| Secondary butyl | Isoleucine |

It will be appreciated that methylamino polymers may contain ethylenimino groups, and that ethylenimino polymers may contain methylamino groups. Polymers in which all R and $R_1$ groups are derived from amino acid esters are water insoluble, but may be dissolved in a number of common organic solvents. Hydrophilicity and water solubility increase with increasing numbers of methylamino substituents.

A particular advantage of the products of this invention, especially those that are substantially soluble in water is that they can be taken up in aqueous media to increase the viscosity thereof to thereby prepare plasma substitutes. Their biodegradability to non-toxic products is especially important for this particular utility.

As stated above, the products of this invention are prepared by reaction between the selected amine or amino acid ester and the selected poly(dichlorophosphazene) in the presence of a hydrogen halide scavenger. The reaction takes place under anhydrous conditions.

In the presently preferred procedure, reaction is carried out in a solvent which must, of course, be reaction inert. Any of a wide variety of solvents that will dissolve the polymeric starting material may be employed. These include, for example, aromatic hydrocarbon solvents such as benzene and toluene and cyclic ethers such as dioxane and tetrahydrofuran.

The time and temperature of the reaction will vary within very wide ranges, depending principally on the selected reactants. If only an amino acid ester is to be substituted, the preferred temperature range is from about 50°C. to 150°C. during a period of from about 2 to 48 hours. For substitution of a methylamino or ethylenimino group, the temperature range may extend to as low as −32°C. to up to 20°C., and the time to as long as 48 hours.

While it is preferred first to form the amino acid ester polymer and to form the methylamino compound by further reaction with a methyl amine hydrochloride, it is also possible to react both amino acid ester and methyl amine simultaneously. For this concurrent type of reaction, the preferred temperature range is from 0°C. to 20°C., and the time from 16 to 24 hours.

A few simple observations will permit those skilled in the art readily to determine the optimum temperature and time of reaction for a particular set of reactants.

It is generally preferred to use a molar excess of reactants, based on the amount of polymer substrate employed. If the final product is to be devoid of methylamino or ethylenimino groups, at least an equimolar amount of amino acid ester, and preferably up to about a 25 to 50 percent molar excess, will be employed. If the substrate is to be further substituted with methylamino, or ethylenimino groups, or both, the total number of moles of reactants, that is amino acid ester, methyl amine, and/or ethylenimine will be at least equimolar based on the initial polymer reactant. Preferably the total will be a 25 to 50 percent molar excess. As will be apparent from what has been said above, the ratio of the replacement reactants to each other will depend upon the desired properties of the final product.

The various methods of isolation of the final product are illustrated in the examples. Normally, the procedure will vary with the solubility characteristics of the product. If it is soluble in the organic solvent in which it is prepared, it may be isolated by evaporation of the solvent or precipitation with a nonsolvent, after removing the insoluble salt formed from the scavenger by filtration. If both polymer and amine salt are insoluble in the organic reaction medium, but soluble in water, the amine salt can be removed by dialysis using water.

The following non-limiting examples are given by way of illustration only:

EXAMPLE 1

Poly[bis(ethyl glycino)phosphazene]

About 55 g (0.475 moles) of poly(dichlorophosphazene) was dissolved in 2 liters of benzene that had been freshly distilled from calcium hydride. The solution was stirred overnight under dry nitrogen. A mixture of 210 g (1.51 moles) glycine ethyl ester hydrochloride, dried for two weeks in a vacuum oven at 50°C., in 1 liter of dry benzene was refluxed two hours with 590 ml (4.30 moles) of triethylamine. The polymer solution was filtered and added dropwise to the reaction vessel. The resultant mixture was stirred just below reflux for 24 hours, and allowed to cool and settle overnight.

The hydrochloride salt of triethylamine was filtered from the reaction mixture, and the benzene solution was concentrated by evaporation of the solvent.

Polymer trapped in the reaction salt was extracted by stirring with acetone and filtration of the suspension. The combined polymer solutions were poured onto a Teflon sheet and the benzene was allowed to evaporate. The resultant adhesive polymer was dissolved in acetone and precipitated twice from acetone into water, then twice from acetone into a 1:1 mixture of hexane and petroleum ether. The product formed flexible films.

Analytical tests indicated the absence of any chlorine in the purified product. The infrared spectrum showed a weak absorption at 3340 cm$^{-1}$ (N-H), and absorption at 1200 cm$^{-1}$ (P=N), a strong absorption at 1740 cm$^{-1}$ (C=O), and strong absorption at 1140 cm$^{-1}$ (C-N).

The valine product was similarly prepared.

EXAMPLE 2

Poly[bis(methyl-1-leucino)phosphazene]

1-Leucine methyl ester hydrochloride (50 g., 0.27 mole) and triethylamine (54 g., 0.54 mole) in tetrahydrofuran were stirred for 1 hour in order to facilitate formation of the free base. To this stirred slurry was added a solution of poly(dichlorophosphazene) (10.3 g., 0.089 mole) in benzene (500 ml). The reaction mixture was stirred at room temperature for 48 hours and at reflux temperature for an additional 48 hours, and then filtered to remove insoluble products. The polymer was isolated by precipitation of the filtrate into hexane. Purification was effected by numerous precipitations from tetrahydrofuran or acetone solutions into excess hexane. The product was a transparent, colorless, glassy polymer, which was soluble in benzene, tetrahydrofuran, acetone, or ether. Analytical tests indicated that some residual chlorine (2.28 percent) remained in the purified product. This amount of chlorine corresponded to approximately 1 chlorine for every 10 amino groups. However, the polymer was found to be stable to atmospheric moisture over a period of months. The infrared spectrum exhibited a weak absorption at 3300 cm$^{-1}$ (N-H), a strong absorption at 1740 cm$^{-1}$ (C=O), strong absorptions at 1260 and 1200 cm$^{-1}$ (P=N), a strong absorption at 1160 cm$^{-1}$ (C-N), and weak absorption at 790 cm$^{-1}$ (P-N). The optical rotation at the sodium D line was −0.103 g dl$^{-1}$dm$^{-1}$.

Analysis: Calculated for $C_{14}H_{28}O_4N_3P$: C, 48.72; H, 8.10; N, 12.61; P, 9.97.

Found: C, 45.20; H, 8.03; N, 12.25; P, 11.61; Cl, 2.28.

EXAMPLE 3

Poly[bis(methyl 1-alanino)phosphazene]

1-Alanine methyl ester hydrochloride (25 g., 0.179 mole) was added to a stirred solution of triethylamine (115 g., 1.15 mole) and tetrahydrofuran (1000 ml), and the mixture was stirred for 1 hour, under a nitrogen atmosphere, in order to form the free base. To this mixture, a solution of poly(dichlorophosphazene) (8 g., 0.069 mole) in benzene (500 ml) was added in a dropwise manner. The reaction mixture was stirred at room temperature for 24 hours, and then filtered to remove precipitated salts. The filtrate was evaporated to dryness, and the product was redissolved in tetrahydrofuran and precipitated into excess n-heptane. The polymer was purified by precipitations from tetrahydrofuran solution into water. The infrared spectrum exhibited a weak absorption at 3300 cm$^{-1}$ (N-H), a strong absorption at 1730 cm$^{-1}$ (C=O), an absorption at 1220 cm$^{-1}$ (P=N), a strong absorption at 1150 cm$^{-1}$ (C-N), and a weak absorption at 750 cm$^{-1}$ (P-N). The optical rotation at the sodium D line was −0.309 g dl$^{-1}$ dm$^{-1}$. The product formed films when cast from tetrahydrofuran. The flexibility of the films was enhanced in humid conditions.

The ethyl ester derivative was similarly prepared.

EXAMPLE 4

Poly[bis(methyl-1-phenylalanino)phosphazene]

A solution of poly(dichlorophosphazene) (3.5 g., 0.030 mole) in benzene (300 ml) was added to a stirred slurry of 1-phenylalanine methyl ester hydrochloride (20 g., 0.092 mole) and triethylamine (20 g., 0.20 mole) in tetrahydrofuran (800 ml). The amino acid hydrochloride and triethylamine had been stirred for 1 hour prior to addition of the polymer, in order to facilitate formation of the free base. The reaction mixture was stirred at room temperature for 48 hours and at reflux temperature for an additional 48 hours. It was then cooled and filtered to remove insoluble products. The polymer was isolated by precipitation of the filtrate into excess n-heptane. The polymer (5.2 g., 0.013 mole) was purified by repeated precipitations from tetrahydrofuran solutions into water or hexane. Analytical samples were prepared from freeze dried benzene solutions. The polymer was a clear, colorless, glassy material which was soluble in benzene, tetrahydrofuran, carbon tetrachloride or acetone. Although analytical tests indicated that residual chlorine (1.16 percent) was present in the polymer, it was found to be stable to atmospheric moisture over a period of months. The amount of chlorine present corresponded to approximately one chlorine for every 20 amino groups. The infrared spectrum exhibited a medium absorption at 3300 cm$^{-1}$ (N-H), a strong absorption at 1750 cm$^{-1}$ (C=O), a weak absorption at 1600 cm$^{-1}$ (aromatic), and strong absorptions at 1260 and 1200 cm$^{-1}$ (P=N). The optical rotation at the sodium D line was +0.442 g dl$^{-1}$ dm$^{-1}$.

Analysis: Calculated for $C_{20}H_{24}O_4N_3P$: C, 59.85; H, 5.98; N, 10.47; P, 7.73.

Found: C, 55.19; H, 5.90; N, 11.24; P, 10.06; Cl, 1.16.

EXAMPLE 5

Poly[(ethyl glycino methylamino)phosphazene]

Glycine ethyl ester hydrochloride (31.4 g, 0.226 moles) was stirred for one hour at reflux in 1 liter of dry benzene containing 62 ml (0.452 moles) triethylamine. A solution of 16.2 g (0.226 moles) phosphazene polymer in 800 ml dry benzene was added dropwise to the reaction mixture. After the addition was complete, the mixture was heated and stirred at 45°C. for 24 hours, then cooled in an ice bath. Methylamine (100 ml, 2.26 moles) was condensed into the reaction vessel by means of a Dry Ice condenser. The mixture was allowed to warm to room temperature and was stirred for 24 hours. An additional 100 ml of methylamine was added in the same manner as before, and the mixture stirred for 24 hours. The reaction mixture was then filtered through a sintered glass funnel and concentrated by evaporation; no polymer appeared to be in the filtrate. The precipitate was dissolved in water and subjected to dialysis for 5 days. The aqueous solution was concentrated by evaporation of solvent and then cast as a film. The polymer had an intrinsic viscosity in water of 0.98 dl/g. A 1 percent solution of this polymer in water did not accelerate the coagulation of plasma.

The ethylenimino analog of this compound was similarly prepared except that the reaction temperature was −32°C.

EXAMPLE 6

Poly[(methyl alanino)(methylamino)phosphazene]

Alanine methyl ester hydrochloride (25 g., 0.179 moles) dried in vacuo several days, was stirred with 35.8 g (0.358 moles) triethylamine in 1 l dry benzene for 1 hour. To this was added, under nitrogen, a solution of 20.4 g (0.179 moles) of poly(dichlorophosphazene) in 1 l of dry benzene. This mixture was stirred at room temperature 24 hours. The reaction mixture was cooled in an ice bath, and a tenfold excess of methylamine was added as before. The mixture was stirred three days, after which time it was cooled again, and another tenfold excess of methylamine added. After 24 hours, the reaction mixture was filtered.

The solids were stirred with water, and all the precipitate dissolved. The solution was purified by dialysis. The product did not accelerate the clotting of plasma.

The ethyl analog was similarly prepared, and exhibited similar properties.

EXAMPLE 7

Poly[(methyl phenylalanino)(methylamino)phosphazene]

Phenylalanine methyl ester hydrochloride (50 g, 0.232 moles) was dried in vacuo overnight, then stirred for 1 hour at reflux with 46.4 g (0.464 moles) of triethylamine in 1 l dry benzene. To this was added, dropwise under nitrogen, a solution of 26.9 g (0.232 moles) of polydichlorophosphazene in 1 l benzene. The reaction mixture was stirred at reflux for 24 hours.

The reaction mixture was then cooled in an ice bath. About 100 ml (2.32 moles) of monomethylamine was condensed into the reaction flask through a sodium hydroxide drying column by means of a Dry Ice condenser. This mixture was allowed to warm to room temperature and was stirred for 72 hours. At this time, the mixture was cooled in ice again, and an additional 50 ml of monomethylamine was condensed into the flask as before. The mixture was allowed to warm to room temperature and was stirred for 24 hours.

The reaction mixture was filtered to remove precipitated salts. The filtrate was evaporated to dryness, dissolved in THF, and precipitated into hexane to give a yellow precipitate. This product was purified by repeated precipitations into water. It was cast as a film from tetrahydrofuran.

EXAMPLE 8

Poly[(methyl leucino)(methylamino)phosphazene]

Leucine methyl ester hydrochloride (25 g, 0.135 moles) was stirred at reflux with 27 g (0.27 moles) triethylamine in 1000 ml dry benzene for 1 hour. To this was added under nitrogen a solution of poly(dichlorophosphazene) (15.6 g, 0.135 moles) in 700 ml dry benzene. This was stirred at reflux overnight. The reaction vessel was cooled in ice, and 42 g (1.35 moles) monomethylamine was condensed via a dry ice condenser into the reaction mixture. This was stirred for about 65 hours. An additional 42 g methylamine was added, and the mixture stirred for 24 hours.

The reaction mixture was filtered to remove precipitated salts. The filtrate was concentrated by evaporation and poured onto Teflon to dry, producing a brittle yellow solid. The polymer was purified by precipitations from acetone into hexane and from acetone into water. Cast as a film from THF, the polymer dried to a brittle film.

What is claimed is:

1. An amino acid substituted polymer of the formula:

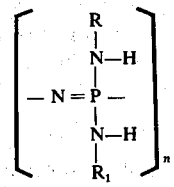

wherein:
A. R is $R_2CHCOOR_3$, $R_2$ being the residual group of an amino acid, and $R_3$ being alkyl containing up to five carbon atoms;
B. $R_1$ is R, as defined above, methylamino or ethylenimino; and
C. $n$ is from about 500 to 20,000; the average number of methylamino groups per repeating unit, when present, being from about 0.25 to 1.75; the average number of ethylenimino groups per repeating unit, when present, being from about 0.0001 to 0.2.

2. A polymer as in claim 1 wherein R and $R_1$ are identical, $R_2$ is hydrogen and $R_3$ is methyl or ethyl.
3. A polymer as in claim 2 wherein $R_3$ is methyl.
4. A polymer as in claim 2 wherein $R_3$ is ethyl.
5. A polymer as in claim 1 wherein R and $R_1$ are identical, $R_2$ is methyl and $R_3$ is methyl or ethyl.
6. A polymer as in claim 5 wherein $R_3$ is methyl.
7. A polymer as in claim 5 wherein $R_3$ is ethyl.
8. A polymer as in claim 1 wherein R and $R_1$ are identical, $R_2$ is isopropyl and $R_3$ is methyl or ethyl.
9. A polymer as in claim 8 wherein $R_3$ is methyl.
10. A polymer as in claim 8 wherein $R_3$ is ethyl.
11. A polymer as in claim 1 wherein R and $R_1$ are identical, $R_2$ is isobutyl and $R_3$ is methyl or ethyl.
12. A polymer as in claim 11 wherein $R_3$ is methyl.
13. A polymer as in claim 11 wherein $R_3$ is ethyl.
14. A polymer as in claim 1 wherein R and $R_1$ are identical, $R_2$ is secondary butyl and $R_3$ is methyl or ethyl.
15. A polymer as in claim 14 wherein $R_3$ is methyl.
16. A polymer as in claim 14 wherein $R_3$ is ethyl.
17. A methylamino polymer as in claim 1 wherein $R_1$, when other than methylamino, is identical with R; $R_2$ is hydrogen and $R_3$ is methyl or ethyl, the average number of methylamino groups per repeating unit being from about 0.25 to 1.75.
18. A polymer as in claim 17 wherein $R_3$ is methyl.
19. A polymer as in claim 17 wherein $R_3$ is ethyl.
20. A methylamino polymer as in claim 1 wherein $R_1$, when other than methylamino, is identical with R; $R_2$ is methyl and $R_3$ is methyl or ethyl, the average number of methylamino groups per repeating unit being from about 0.25 to 1.75.

21. A polymer as in claim 20 wherein $R_3$ is methyl.

22. A polymer as in claim 20 wherein $R_3$ is ethyl.

23. A methylamino polymer as in claim 1 wherein $R_1$, when other than methylamino, is identical with R; $R_2$ is isopropyl and $R_3$ is methyl or ethyl, the average number of methylamino groups per repeating unit being from about 0.25 to 1.75.

24. A polymer as in claim 23 wherein $R_3$ is methyl.

25. A polymer as in claim 23 wherein $R_3$ is ethyl.

26. A methylamino polymer as in claim 1 wherein $R_1$, when other than methylamino, is identical with R; $R_2$ is isobutyl and $R_3$ is methyl or ethyl, the average number of methylamino groups per repeating unit being from about 0.25 to 1.75.

27. A polymer as in claim 26 wherein $R_3$ is methyl.

28. A polymer as in claim 26 wherein $R_3$ is ethyl.

29. A methylamino polymer as in claim 1 wherein $R_1$, when other than methylamino, is identical with R; $R_2$ is secondary butyl and $R_3$ is methyl or ethyl, the average number of methylamino groups per repeating unit being from about 0.25 to 1.75.

30. A polymer as in claim 29 wherein $R_3$ is methyl.

31. A polymer as in claim 29 wherein $R_3$ is ethyl.

32. An ethylenimino polymer as in claim 1 wherein $R_1$, when other than ethylenimino is identical with R, $R_2$ is hydrogen and $R_3$ is methyl or ethyl, the average number of ethylenimino groups per repeating unit being from about 0.0001 to 0.2.

33. A polymer as in claim 32 wherein $R_3$ is methyl.

34. A polymer as in claim 32 wherein $R_3$ is ethyl.

35. An ethylenimino polymer as in claim 1 wherein $R_1$, when other than ethylenimino, is identical with R, $R_2$ is methyl and $R_3$ is methyl or ethyl, the average number of ethylenimino groups per repeating unit being from about 0.0001 to 0.2.

36. A polymer as in claim 35 wherein $R_3$ is methyl.

37. A polymer as in claim 35 wherein $R_3$ is ethyl.

38. An ethylenimino polymer as in claim 1 wherein $R_1$, when other than ethylenimino, is identical with R, $R_2$ is isopropyl and $R_3$ is methyl or ethyl, the average number of ethylenimino groups per repeating unit being from about 0.001 to 0.2.

39. A polymer as in claim 38 wherein $R_3$ is methyl.

40. A polymer as in claim 38 wherein $R_3$ is ethyl.

41. An ethylenimino polymer as in claim 1 wherein $R_1$, when other than ethylenimino, is identical with R, $R_2$ is isobutyl and $R_3$ is methyl or ethyl, the average number of ethylenimino groups per repeating unit being from about 0.001 to 0.2.

42. A polymer as in claim 41 wherein $R_3$ is methyl.

43. A polymer as in claim 41 wherein $R_3$ is ethyl.

44. An ethylenimino polymer as in claim 1 wherein $R_1$, when other than ethylenimino, is identical with R, $R_2$ is secondary butyl and $R_3$ is methyl or ethyl, the average number of ethylenimino groups per repeating unit being from about 0.001 to 0.2.

45. A polymer as in claim 44 wherein $R_3$ is methyl.

46. A polymer as in claim 44 wherein $R_3$ is ethyl.

* * * * *